(12) United States Patent
Kito et al.

(10) Patent No.: US 9,394,157 B2
(45) Date of Patent: Jul. 19, 2016

(54) FUELING DEVICE AND MANUFACTURING METHOD OF A FUELING DEVICE

(71) Applicant: TOYODA GOSEI CO., LTD., Kiyosu-shi, Aichi-ken (JP)

(72) Inventors: Hiroaki Kito, Kiyosu (JP); Yoshinari Hiramatsu, Kiyosu (JP); Atsushi Sekihara, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 234 days.

(21) Appl. No.: 14/178,514

(22) Filed: Feb. 12, 2014

(65) Prior Publication Data

US 2014/0230962 A1 Aug. 21, 2014

(30) Foreign Application Priority Data

Feb. 15, 2013 (JP) ................................. 2013-027398
Jun. 25, 2013 (JP) ................................. 2013-132512

(51) Int. Cl.
*B60K 15/04* (2006.01)
*B67D 7/42* (2010.01)
(Continued)

(52) U.S. Cl.
CPC .............. *B67D 7/42* (2013.01); *B29C 65/1635* (2013.01); *B29C 65/1654* (2013.01); *B29C 65/1677* (2013.01); *B29C 66/1312* (2013.01); *B29C 66/30223* (2013.01); *B29C 66/543* (2013.01); *B29C 66/545* (2013.01); *B29C 66/65* (2013.01); *B60K 15/00* (2013.01); *B60K 15/04* (2013.01); *B29C 65/08* (2013.01); *B29C 65/20* (2013.01); *B29C 66/71* (2013.01); *B29C 66/712* (2013.01); *B60K 2015/047* (2013.01);
(Continued)

(58) Field of Classification Search
CPC ........... B60K 15/04; B60K 2015/0461; B60K 2015/047; B29C 65/08; B29C 65/1635; B29C 66/543; B29C 66/545
USPC .............................. 141/1, 348–350; 220/86.2
See application file for complete search history.

(56) References Cited

U.S. PATENT DOCUMENTS 6,305,408 B1    10/2001  Goto et al.
6,474,376 B2 *  11/2002  Hagano .................. B60K 15/04
                                              141/312

(Continued)

FOREIGN PATENT DOCUMENTS

JP    H02-45589 U     3/1990
JP    2000-280764 A   10/2000

(Continued)

*Primary Examiner* — Nicolas A Arnett
(74) *Attorney, Agent, or Firm* — Posz Law Group, PLC

(57) ABSTRACT

A fueling device includes a fuel passage-forming member and a flap valve mechanism. The flap valve mechanism includes an opening-forming member attached to one end of the fuel passage-forming member and an opening-closing mechanism to open and close a filler inlet of the opening-forming member. The fuel passage-forming member includes a pipe body containing a resin inner layer in a pipe shape made of a first resin material and a resin outer made of a second resin material, and a welding end formed on an opening end of the pipe body. The opening-forming member includes a cover member that covers the opening end of the pipe body and a welded end formed on an opening end of the cover member and welded to the welding end. The cover member is made of a third resin material welded to either one of the first resin material and the second resin material.

6 Claims, 9 Drawing Sheets

(51) Int. Cl.
  *B60K 15/00* (2006.01)
  *B29C 65/16* (2006.01)
  *B29C 65/00* (2006.01)
  *B29C 65/08* (2006.01)
  *B29C 65/20* (2006.01)

(52) U.S. Cl.
  CPC ....... *B60K 2015/0461* (2013.01); *Y02T 10/123* (2013.01); *Y10T 29/494* (2015.01)

(56) References Cited

U.S. PATENT DOCUMENTS

| | | | |
|---|---|---|---|
| 6,681,817 B2* | 1/2004 | Hagano | B60K 15/04 141/312 |
| 6,866,297 B2* | 3/2005 | Morohoshi | B29C 65/02 137/202 |
| 6,880,593 B1 | 4/2005 | Swane | |
| 7,320,769 B2* | 1/2008 | Aoki | B29C 45/16 264/250 |
| 7,708,036 B2* | 5/2010 | Bar | B60K 15/04 141/350 |
| 8,347,914 B2* | 1/2013 | Runarvot | B60K 15/04 137/588 |
| 2002/0092581 A1 | 7/2002 | Hagano et al. | |
| 2002/0121517 A1* | 9/2002 | Aoki | B29C 45/16 220/4.14 |
| 2004/0164463 A1* | 8/2004 | Aoki | B29C 45/16 264/512 |
| 2005/0121105 A1* | 6/2005 | Kaneko | B60K 15/04 141/301 |
| 2007/0000928 A1* | 1/2007 | Nishiyama | B29C 65/02 220/562 |
| 2009/0078336 A1* | 3/2009 | Baudoux | B60K 15/04 141/311 R |
| 2010/0147404 A1 | 6/2010 | Runarvot et al. | |

FOREIGN PATENT DOCUMENTS

| | | |
|---|---|---|
| JP | 2001-88858 A | 4/2001 |
| JP | 2005-153693 A | 6/2005 |
| JP | 4356608 B2 | 11/2009 |
| JP | 2009-545479 A | 12/2009 |

* cited by examiner

FUELING DEVICE AND MANUFACTURING METHOD OF A FUELING DEVICE

CROSS-REFERENCE TO RELATED APPLICATIONS

The present application claims priority from Japanese applications P2013-027398 filed on Feb. 15, 2013 and P2013-132512 filed on Jun. 25, 2013, the contents of which are hereby incorporated by reference into this application.

BACKGROUND OF INVENTION

1. Field of the Invention

The invention relates to a fueling device that includes a fuel passage for introducing a fuel to a fuel tank.

2. Description of the Related Art

A fueling device has a known configuration that includes a pipe having a fuel passage, a metal retainer attached to an end of the pipe and a fuel cap detachably attached to a screw of the retainer as described in, for example, Japanese Patent 4356608B. In order to suppress a fuel flowing in the fuel passage from being transmitted to the outside, the pipe has a resin inner layer (barrier layer) having the excellent resistance to fuel permeation and a resin outer layer laid on an outer surface of the barrier layer.

Another fueling device has a known configuration that does not use a fuel cap but has a flap valve mechanism which opens and closes a filler inlet of a pipe with a flap valve supported on the pipe.

The fueling device equipped with the flap valve mechanism described above needs an additional part, such as an O ring or a metal retainer for assembling the pipe. This results in the complicated configuration.

SUMMARY OF INVENTION

In order to solve at least part of the problems described above, the invention may be implemented by the following aspects.

According to one aspect of the invention, there is provided a fueling device that supplies a fuel to a fuel tank. The fueling device comprises a fuel passage-forming member that includes a fuel passage connected with the fuel tank; and a flap valve mechanism that includes an opening-forming member attached to one end of the fuel passage-forming member, and an opening-closing mechanism attached to the opening-forming member to open and close a filler inlet of the opening-forming member, wherein the fuel passage-forming member includes a pipe body and a welding end formed on an opening end of the pipe body the pipe body includes a resin inner layer in a pipe shape made of a first resin material and a resin outer layer laid on an outer surface of the resin inner layer and made of a second resin material, and the opening-forming member includes a cover member that covers the opening end of the pipe body and a welded end formed on an opening end of the cover member and welded to the welding end, and the cover member is made of a third resin material welded to either one of the first resin material and the second resin material.

The flap valve mechanism is integrally fixed to the fuel passage-forming member by welding. This facilitates the assembling operation. The flap valve mechanism is constructed by mounting the opening-closing mechanism of the complicated structure on the cover member in advance. The flap valve mechanism can thus readily be integrated with the fuel passage-forming member without being limited by the shape of the fuel passage-forming member.

The welding end of the fuel passage-forming member and the welded end of the cover member are sealed to each other by welding. This ensures the high sealing property without using any additional sealing member such as an O ring. There is no need to use any engagement mechanism such as claws for mounting the cover member to the fuel passage-forming member. This simplifies the structures of the fuel passage-forming member and the cover member.

According to another aspect of the invention, there is provided a fueling device that supplies a fuel to a fuel tank. The fueling device comprises a fuel passage-forming member that includes a fuel passage connected with the fuel tank; and a flap valve mechanism that includes an opening-forming member attached to one end of the fuel passage-forming member, and an opening-closing mechanism attached to the opening-forming member, to open and close a filler inlet of the opening-forming member, wherein the fuel passage-forming member includes a pipe body in a pipe shape made of a resin material, and a welding end formed at top of the pipe body, the opening-forming member includes a filler inlet-forming member containing the filler inlet, and a welded end formed in the filler inlet-forming member, the welded end is made of a resin material welded to the resin material of the welding end and is welded to the welding end, and the welding end is located below an end face of the fuel passage-forming member in an axial direction.

According to another aspect of the invention, there is provided a manufacturing method of a fueling device that supplies a fuel to a fuel tank. The manufacturing method comprises the steps of providing a fuel passage-forming member that includes a fuel passage connected with the fuel tank, and a flap valve mechanism, wherein the flap valve mechanism includes an opening-forming member and an opening-closing mechanism configured to open and close a filler inlet of the opening-forming member, the fuel passage-forming member includes a pipe body in a pipe shape made of a resin material, and a welding end formed at top of the pipe body, the opening-forming member includes a filler inlet-forming member includes the filler inlet, and a welded end formed in the filler, inlet-forming member, and the welded end is made of a resin material welded to the resin material of the welding end; forming a ring-shaped projection of a triangular cross section on either one of the welding end and the welded end; fixing the fuel passage-forming member and the flap valve mechanism, such that the welding end and the welded end are in contact with each other; and causing a laser beam to pass through the welding end or the welded end and irradiating the ring-shaped projection with the laser beam.

DESCRIPTION OF EMBODIMENTS

A. First Embodiment (1) General Configuration of Fueling Device

Figure 1:
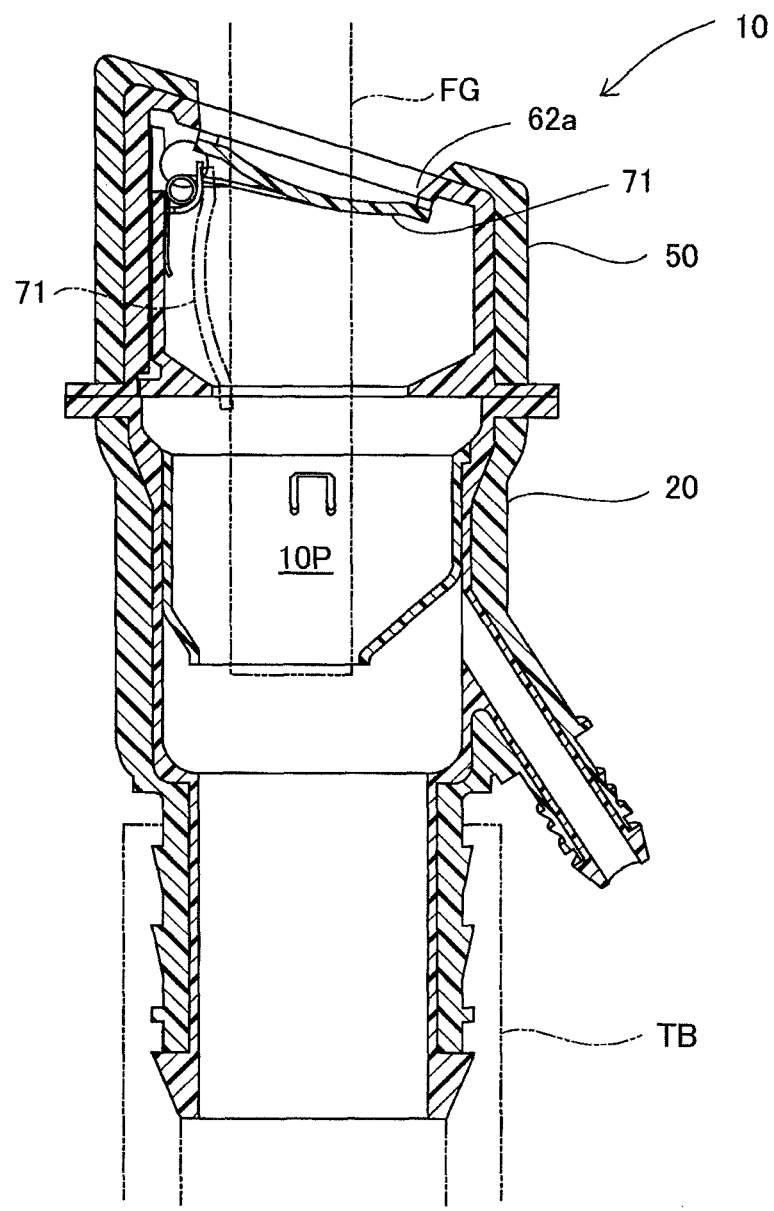
FIG. 1 is a cross sectional view illustrating the fueling device according to the first embodiment.

The following describes a fueling device 10 according to the first embodiment of the invention. FIG. 1 is a cross sectional view illustrating the fueling device 10 according to this embodiment. The fueling device 10 is a mechanism configured to supply a fuel to an automobile fuel tank and includes a fuel passage-forming member 20, a tube TB connected with a lower portion of the fuel passage-forming member 20, and a flap valve mechanism 50 attached to an upper portion of the fuel passage-forming member 20. According to this configuration, when an opening-closing member 71 of the flap valve mechanism 50 is pressed by a fuel gun FG during fueling to open a filler inlet 62a and inject fuel from the fuel gun FG into the fuel passage-forming member 20, the fuel is supplied through a fuel passage 10P of the fuel passage-forming member 20 into the fuel tank. The following describes the structures of the respective components.

(2) Structures of Respective Components of Fueling Device (2)-1 Structure of Fuel Passage-Forming Member 20

Figure 2:
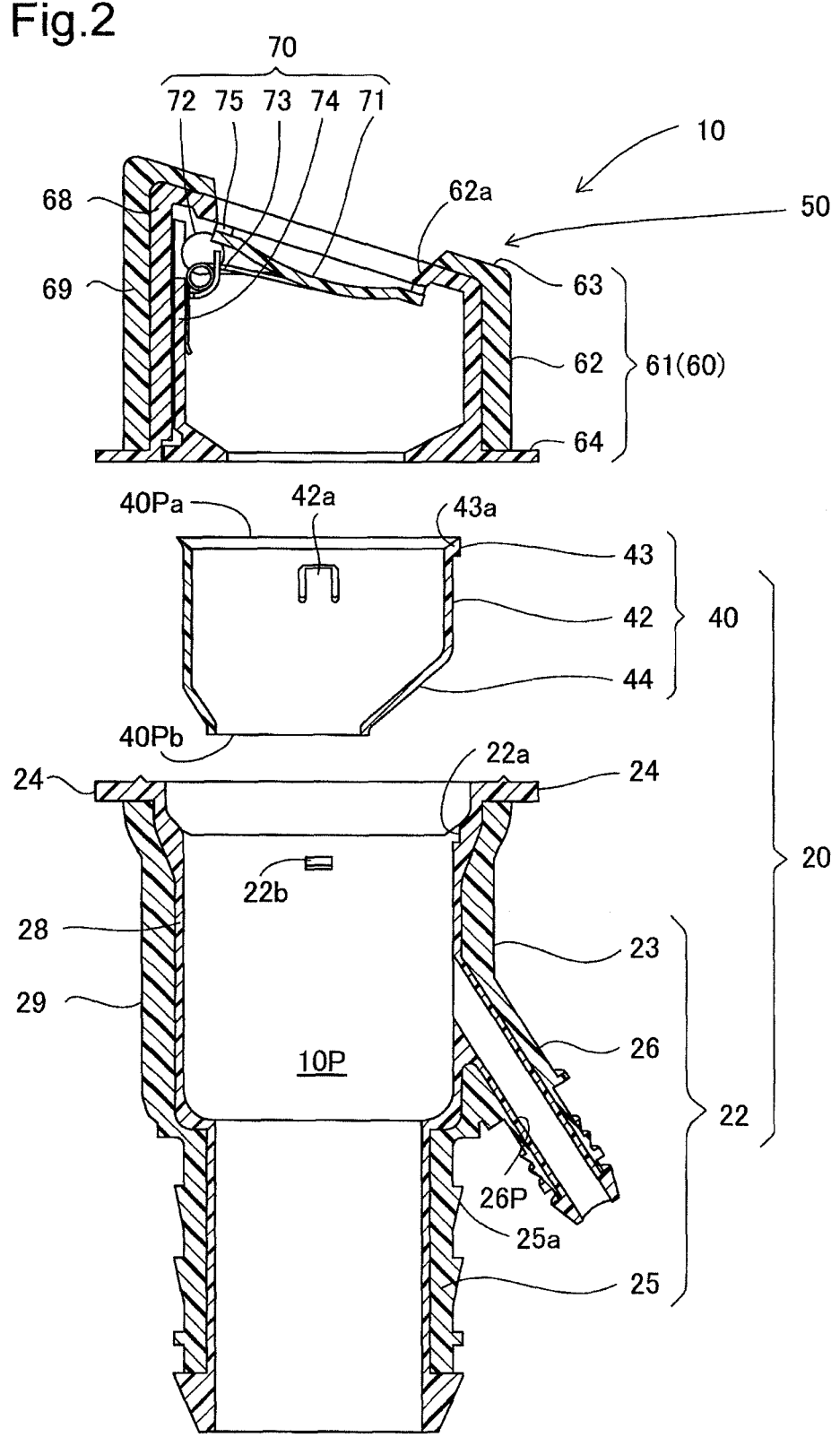
FIG. 2 is an exploded cross sectional view of the fueling device.

FIG. 2 is an exploded cross sectional view of the fueling device 10. In FIG. 2, the fueling device 10 includes the fuel passage-forming member 20 located on a fuel tank side and the flap valve mechanism 50 attached to the upper portion of the fuel passage-forming member 20. The fuel passage-forming member 20 includes a pipe body 22 and a nozzle guide member 40.

The pipe body 22 is formed by stacking two different resin materials and includes a neck upper section 23, a neck connector 25 and a breather pipe 26. The neck upper section 23 is a cylindrical member and has a flange-shape welding end 24 provided on its inner wall to be welded to an opening-forming member 60. The neck upper section 23 has a step 22a and an engagement claw 22b for attachment of the nozzle guide member 40 to its inner wall and engagement of the nozzle guide member 40. The neck connector 25 is a cylindrical member of the reduced diameter integrally formed with a lower portion of the pipe body 22 to constitute part of the fuel passage 10P and has ring-shaped projection 25a provided on it outer periphery. The tube TB (FIG. 1) inserted into the neck connector 25 is retained by the ring-shaped projections 25a and is connected with the neck connector 25. The breather pipe 26 is a tubular body branched off from a side wall of the neck upper section 23 and forms inside a breather passage 26P. The breather passage 26P is connected to the fuel tank to return the fuel vapor in the fuel tank during refueling into the fuel passage-forming member 20 and thereby enable smooth refueling.

The pipe body 22 is formed by stacking two different resin materials and, in other words, includes an resin inner layer 28 on the side of the fuel passage 10F and an resin outer layer 29 laid on the outer surface of the resin inner layer 28. The resin inner layer 28 is made of a resin material having excellent resistance to fuel permeation, for example, polyamide (PA) such as nylon or ethylene vinyl alcohol copolymer (EVOH) and mainly serves as a barrier layer to suppress permeation of the fuel. The resin outer layer 29 is made of a resin material having excellent mechanical strength, for example, polyethylene (PE) and mainly serves as a layer providing the pipe body 22 with mechanical strength and shock resistance. In the case of using polyethylene for the resin outer layer 29, the resin material used may be a resin material modified with maleic acid as the polar functional group. The modified polyethylene is joined with PA by chemical bonding and is accordingly bonded to the resin inner layer 28.

The nozzle guide member 40 is a member serving to introduce the fuel gun to the fuel passage 10P and is placed inside the pipe body 22 via a mechanical engagement mechanism. The nozzle guide member 40 includes a guide body 42, a flange 43 formed at the top of the guide body 42 and a reduced diameter section 44 formed at the bottom of the guide body 42, which are made of a resin material such as polyacetal (POM) by injection molding. The inner space of the nozzle guide member 40 has an upper opening 40Pa and a lower opening 40Pb. The engagement mechanism includes an engaging claw 42a formed on the guide body 42 and an engagement step 43a formed on the flange 43. The engaging claw 42a engaged with the engagement claw 22b formed on the inner wall of the neck upper section 23, while the engagement step 43a is fit in the step 22a, so that the nozzle guide member 40 is placed in the neck upper section 23.

(2)-2 Flap Valve Mechanism 50

The flap valve mechanism 50 includes an opening-forming member 60 mounted at the top of the fuel passage-forming member 20 and an opening-closing mechanism 70 held by the opening-forming member 60 to be openable and closable. The opening-forming member 60 has a cover member 61. The cover member 61 includes a cylindrical side wall section 62, an upper wall section 63 formed at an angle at the top of the side wall section 62 and a flange-shape welded end 64 formed at the bottom of the side wall section 62. The upper wall section 63 has a filler inlet 62a, through which the fuel gas is inserted. The welded end 64 is fixed to the welding end 24 of the pipe body 22 of the fuel passage-forming member 20 by welding. The welding structure of the welded end 64 and the welding end 24 will be described later.

Like the fuel passage-forming member 20, the cover member 61 is formed by stacking two different resin materials and, in other words, includes an resin inner layer 68 on the side of the fuel passage 10P and an resin outer layer 69 laid on the outer surface of the resin inner layer 68. The resin inner layer 68 is made of a resin material having excellent resistance to fuel permeation, for example, polyamide (PA) such as nylon or ethylene vinyl alcohol copolymer (EVOH) and mainly serves as a barrier layer to suppress permeation of the fuel. The resin outer layer 69 is made of a resin material having excellent mechanical strength, for example, polyethylene (PE) and mainly serves as a layer providing the pipe body 22 with mechanical strength and shock resistance. In the case of using polyethylene for the resin outer layer 69, the resin material used may be a resin material modified with maleic acid as the polar functional group. The modified polyethylene is joined with PA by chemical bonding and is accordingly bonded to the resin inner layer 68.

The opening-closing mechanism 70 includes an opening-closing member 71, a bearing 72, a spring 73, a support member 74 provided to support the bearing 72 and the spring 73 relative to the cover member 61, and a gasket 75. The opening-closing member 71 is pressed by an edge of the fuel gun to rotate about the bearing 72, so as to open the filler inlet 62*a*. The gasket 75 is attached to the opening periphery of the filler inlet 62*a* and is pressed by the opening-closing member 71 to close the filler inlet 62*a* in the sealed state.

(3) Manufacturing Method of Refueling Device 10

The manufacturing method of the fueling device 10 first produces the fuel passage-forming member 20 and the opening-forming member 60 by injection molding. The fuel passage-forming member 20 is produced by two-color injection molding of two different resin materials. The method injects, as the first resin material, modified polyethylene for formation of the resin outer layer 29 and subsequently injects polyamide for formation of the resin inner layer 28. The modified polyethylene is a resin material having polar functional group, for example, functional group modified with maleic acid, added to polyethylene (PE) and is made to react with and bonded to polyamide (PA) by heat during injection molding. The resin inner layer 28 and the resin outer layer 29 are accordingly welded to and integrated with each other through reaction bonding by two-color molding. Like the fuel passage-forming member 20, the opening-forming member 60 is made of two different resin materials by injecting the modified polyethylene to form the resin outer layer 69 and subsequently injecting polyamide to form and stack the resin inner layer 68. The manufacturing method subsequently mounts the nozzle guide member 40 formed in advance by injection molding on the pipe body 22. More specifically, the engaging claw 42*a* and the engagement step 43*a* of the nozzle guide member 40 are respectively engaged with the engagement claw 22*b* and the step 22*a* of the pipe body 22, so that the nozzle guide member 40 is mounted on the pipe body 22. The opening-closing mechanism 70 is then mounted on the opening-forming member 60.

Figure 3:
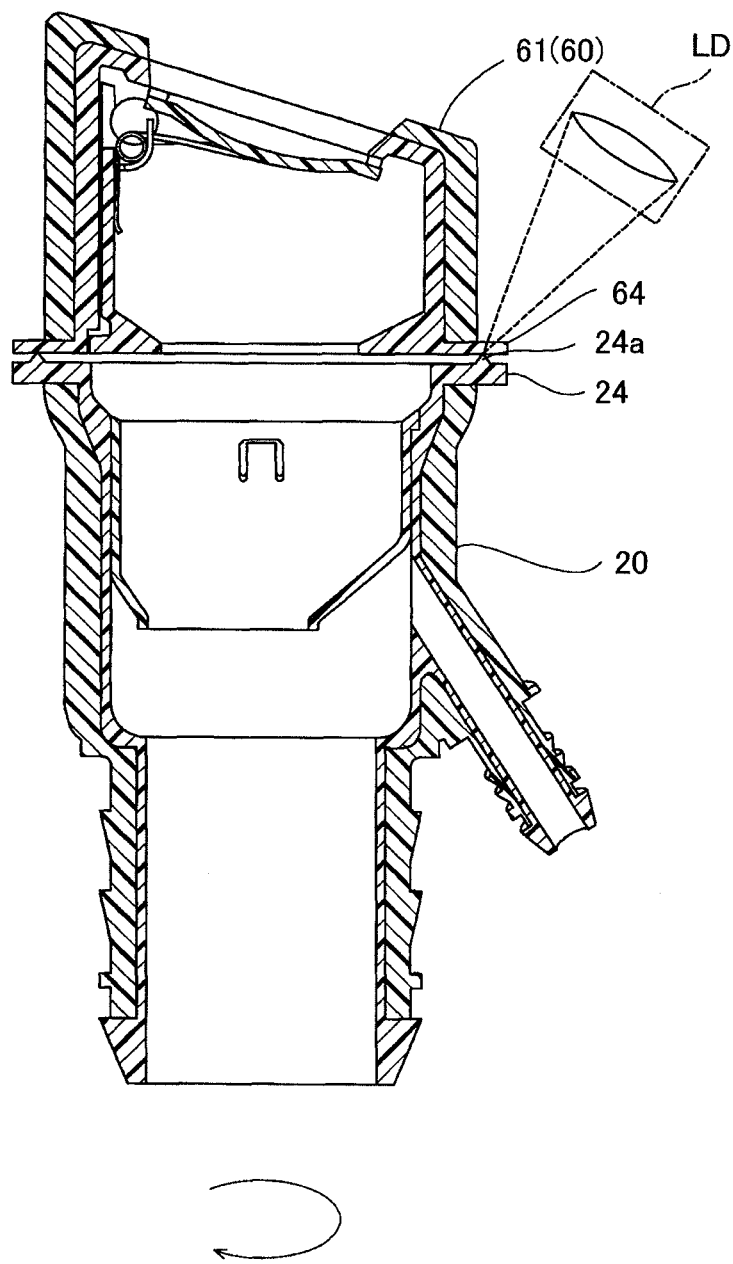
FIG. 3 is a diagram illustrating the step of laser welding the opening-forming member to the fuel passage-forming member.

The manufacturing method subsequently performs a laser welding step to integrate the opening-forming member 60 with the fuel passage-forming member 20. FIG. 3 is a diagram illustrating the step of laser welding the opening-forming member 60 to the fuel passage-forming member 20. The method first mounts the fuel passage-forming member 20 on a support base and places the opening-forming member 60 at an end of the fuel passage-forming member 20. More specifically, the welded end 64 of the opening-forming member 60 is aligned with the welding end 24, and the opening-forming member 60 is fixed by for example, a chuck (not shown). Laser absorption of the welding end 24 may be enhanced by forming a ring-shaped projection 24*a* and additionally containing 0.1 to 2.0 parts by weight of carbon black.

The method then points a laser irradiation apparatus LD at the welding end 24 and the welded end 64 and irradiates the projection 24*a* with laser beam, while rotating the support base which the fuel passage-forming member 20 is supported on. The laser beam accordingly passes through the welded end 64 and reaches the ring-shaped projection 24*a* of the welding end 24. The welding end 24 contains 0.1 to 2.0 parts by weight of carbon black and accordingly absorbs laser beam to melt the inclined surface of the ring-shaped projection 24*a* and the inner surface of the cover member 61. The respective melted parts are made of the same resin material (PA) to be compatible with each other and are welded to each other by cooling and solidifying. This provides the fueling device 10 as shown in FIG. 4.

(4) Functions and Advantageous Effects of Embodiment

The configuration of the above embodiment has the following advantageous effects, in addition to those described above.

Figure 4:
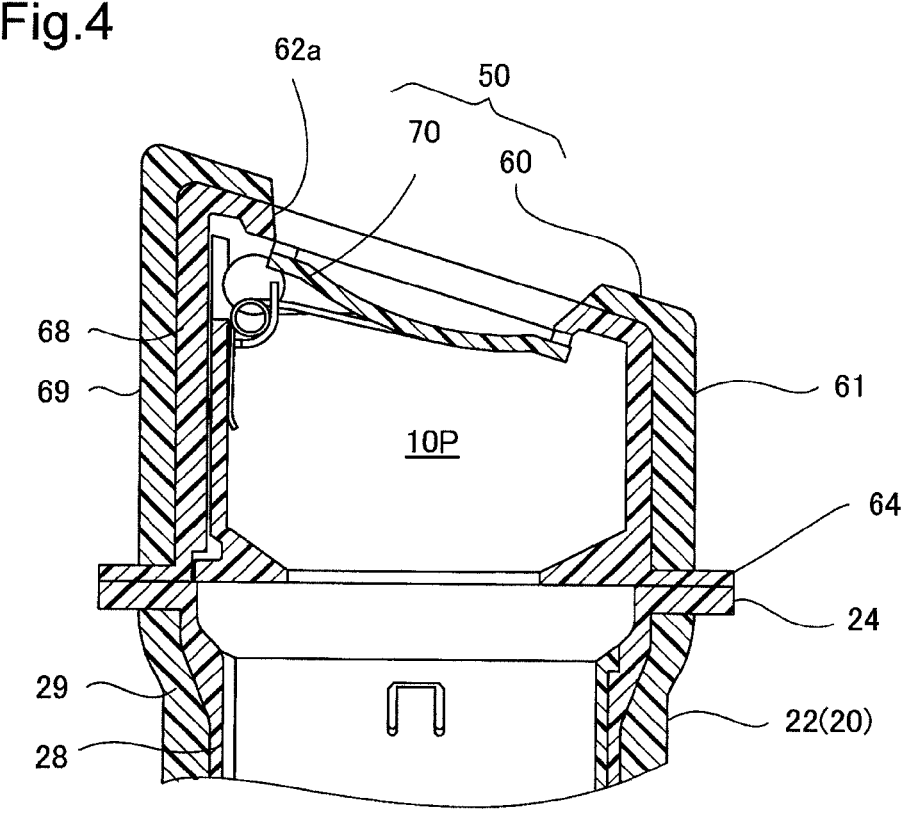
FIG. 4 is a diagram illustrating functions of the fueling device.

(4)-1 As shown in FIG. 4, the flap valve mechanism 50 is integrally mounted on the fuel passage-forming member 20 by laser welding. This facilitates the assembling operation. The flap valve mechanism 50 is constructed by mounting the opening-closing mechanism 70 of the complicated structure on the cover member 61 in advance. The flap valve mechanism 50 can thus readily be integrated with the fuel passage-forming member 20 without being limited by the shape of the fuel passage-forming member 20.

(4)-2 The entire circumferences of the welding end 24 of the fuel passage-forming member 20 and the welded end 64 of the cover member 61 are sealed to each other by laser welding. This ensures the high sealing property without using any additional sealing member such as an O ring.

(4)-3 The fuel passage-forming member 20 and the cover member 61 are in close contact with each other via the welding end 24 and the welded end 64 in the flange shapes of the increased contact areas and are thus securely welded to each other. In the case that there is a clearance between resin members during laser welding, energy is not focused and the resin members are unlikely to reach their melting temperatures. According to this embodiment, however, the welding end 24 and the welded end 64 are in close contact with each other over the wide area and are thus securely welded to each other.

(4)-4 There is no need to use any engagement mechanism such as claws for mounting the cover member 61 to the fuel passage-forming member 20. This simplifies the structures of the fuel passage-forming member 20 and the cover member 61. The sealing performance is enhanced by forming a ring-shaped projection of a triangular cross section (for example, 24*a* in FIG. 3) on either the welding end 24 or the welded end 64. In the laser welding step, energy is focused on the ring-shaped projection 24*a*. This enables shortening of the laser welding step and downsizing of the laser apparatus.

(4)-5 The pipe body 22 has the resin inner layer 28 and the resin outer layer 29 made of different resin materials. More specifically, the resin inner layer 28 is made of polyamide (nylon) having the excellent resistance to fuel permeation, and the resin outer layer 29 is made of polyethylene having excellent mechanical strength. The resin inner layer 68 and the resin outer layer 69 of the cover member 61 are also made respectively of polyamide (nylon) and polyethylene. Accordingly, the resin inner layers 28 and 68 surrounding the fuel passage 10P reduce release of the fuel to the outside, while the resin outer layers 29 and 69 exposed to the outside have high deformation resistance to an external shock.

(4)-6 The resin outer layers 29 and 69 are made of the modified polyethylene. The modified polyethylene is the resin material having polar functional group, for example, functional group modified with maleic acid, added to polyethylene (PE) and is made to react with and bonded to polyamide (PA) by heat during injection molding. Accordingly, the resin inner layer 28 and the resin outer layer 29 are welded to and integrated with each other at the respective interfaces through reaction bonding by two-color injection molding. Adhesion of the resin inner layers 28 and 68 to the resin outer layers 29 and 69 at the respective interfaces increases the resistance to fuel permeation. Additionally, the two-color molding process injects polyamide having the higher temperature after injection of polyethylene. This enhances the adhesiveness between these two resin materials.

B. Second Embodiment

Figure 5:
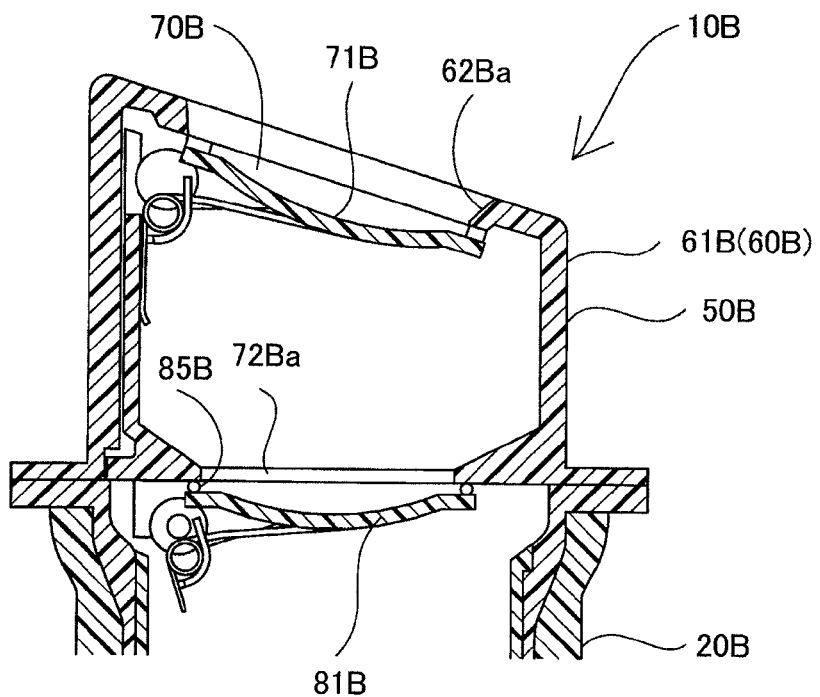
FIG. 5 is a cross sectional view illustrating a fueling device according to the second embodiment.

FIG. 5 is across sectional view illustrating a fueling device 10B according to the second embodiment. This embodiment is characterized by the structures of a cover member 61B and an opening-closing mechanism 70B. The cover member 61B is made of polyamide such as nylon. The opening-closing mechanism 70B includes an opening-closing member 81B arranged to open and close a filler inlet 72Ba located on the tank side of a lower filler inlet 62Ba of an opening-forming member 60B, in addition to an opening-closing member 71B. The opening-closing member 81B closes the filler inlet 72Ba in the sealed state by a gasket 85B. According to this configuration, the two opening-closing members 71B and 81B are mounted on the opening-forming member 60B, so that a flap valve mechanism 50B is welded to a fuel passage-forming member 20B. The flap valve mechanism 50B is closed by the opening-closing member 81B to reduce fuel permeation from the cover member 61B. The cover member 61B has the single resin layer of nylon by giving much weight to the mechanical strength. This simplifies the structure of the cover member 61B.

C-D. Third Embodiment

Figure 6:
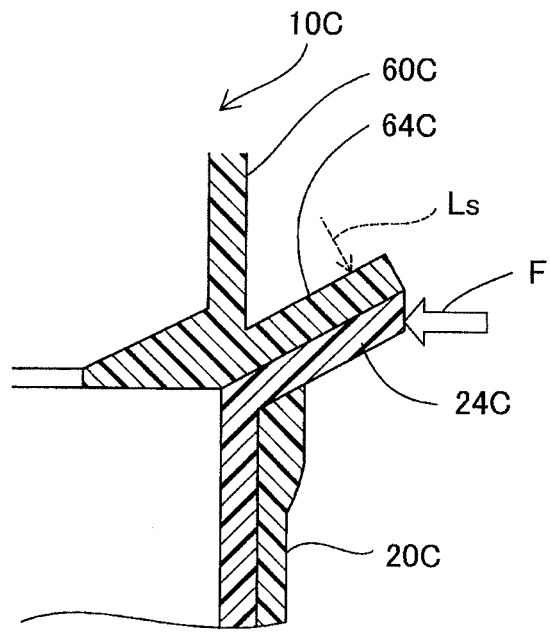
FIG. 6 is a cross sectional view illustrating a main part of a fueling device according to the third embodiment.

FIG. 6 is a cross sectional view illustrating a main part of a fueling device 100 according to a third embodiment. This embodiment is characterized by the structures of a welding end and a welded end. In the fueling device 100, a welding end 240 of a fuel passage-forming member 200 and a welded end 640 of an opening-forming member 600 are formed in flange shapes inclined to the insertion side of a fuel gun, i.e., outside of a vehicle body relative to the axial direction of the fuel passage-forming member 200. Even when an external force F reaches the welding end 24C and the welded end 64C, this configuration reduces the shear force and makes the opening-forming member 60C unlikely to be detached from the fuel passage-forming member 20C.

Figure 7:
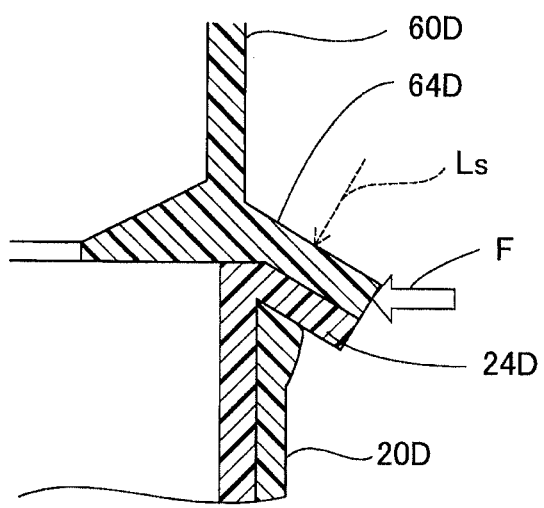
FIG. 7 is a cross sectional view illustrating a main part of a fueling device according to a modification of the third embodiment.

As a modification of the third embodiment shown in FIG. 6, a welded end 64D of an opening-forming member 60D and a welding end 24D of a fuel passage-forming member 20D may be inclined to the fuel tank side as shown in FIG. 7. This has the similar advantageous effects to those of FIG. 6.

E. Fourth Embodiment

Figure 8:
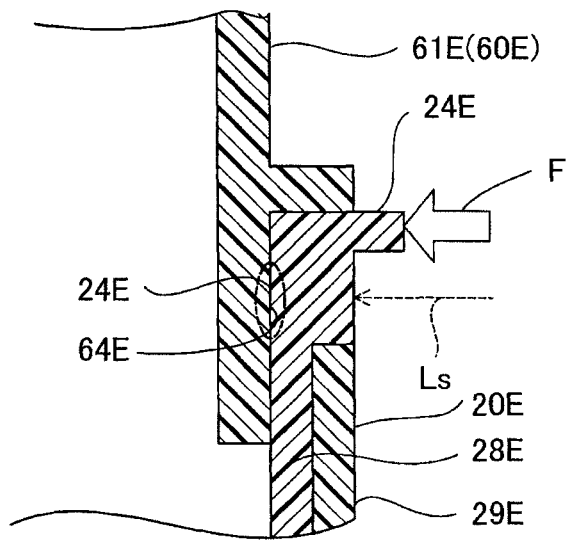
FIG. 8 is a cross sectional view illustrating a main part of a fueling device according to the fourth embodiment.

FIG. 8 is a cross sectional view illustrating a main part of a fueling device according to the fourth embodiment. This embodiment is characterized by the welding position between an opening-forming member 60E and a fuel passage-forming member 20E. The fuel passage-forming member 20E has a resin inner layer 28E and a resin outer layer 29E. The opening-forming member 60E and the fuel passage-forming member 20E are positioned at flanges on respective ends. The resin inner layer 28E of the fuel passage-forming member 20E and a cover member 61E of the opening-forming member 60E are welded to each other at a welding end 24E and a welded end 64E by laser irradiation in the lateral direction. The welding position is not limited to the flanges but may be any location where the cover member 61E is securely welded to the fuel passage-forming member 20E.

F. Fifth Embodiment

Figure 9:
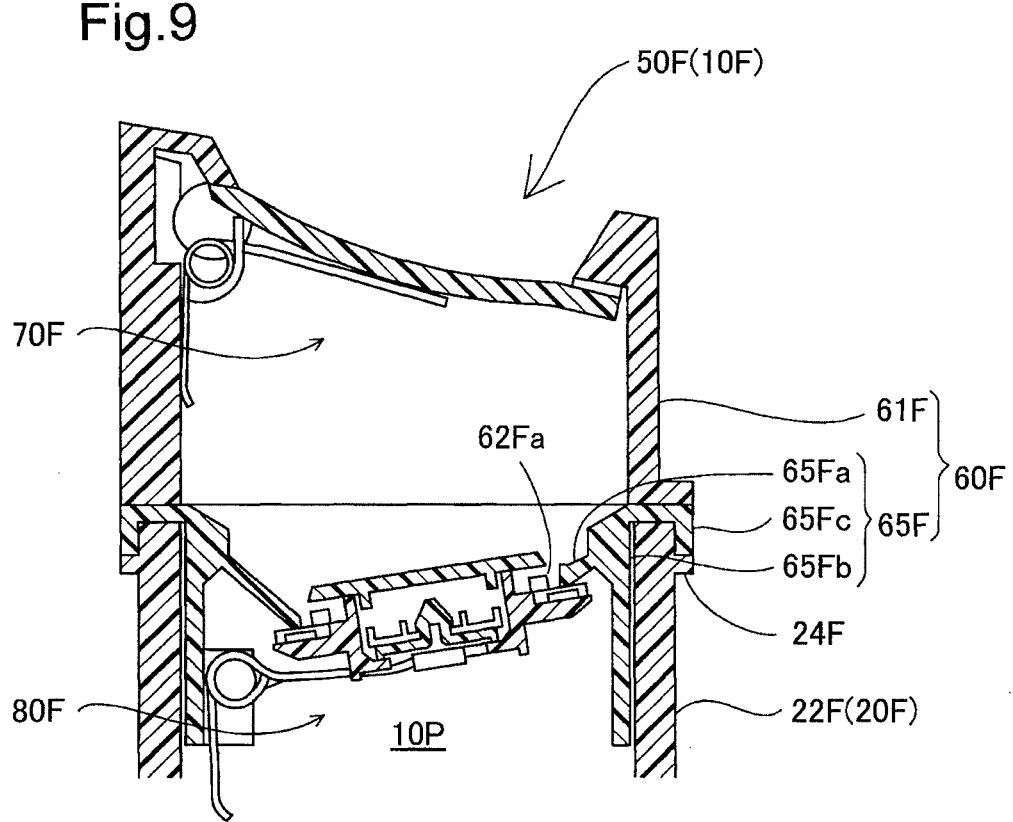
FIG. 9 is a cross sectional view illustrating an upper portion of a fueling device according to the fifth embodiment.
Figure 10:
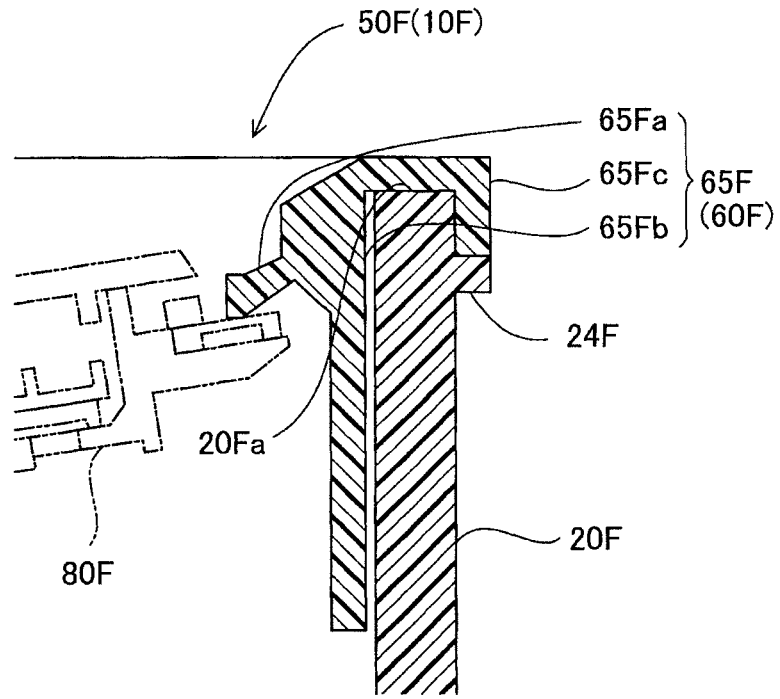
FIG. 10 is an enlarged cross sectional view of the main part of FIG. 9.

FIG. 9 is a cross sectional view illustrating an upper portion of a fueling device 10F according to the fifth embodiment. FIG. 10 is an enlarged cross sectional view of the main part of FIG. 9. This embodiment is characterized by the structures of a fuel passage-forming member 20F and an opening-forming member 60F. The fuel passage-forming member 20F has a welding end 24F on the lower side (fuel tank side) in the axial direction of a circular end face 20Fa having a predetermined width in the fuel passage-forming member 20F. The welding end 24F is in a disc shape protruded radially outward from the lateral surface of the fuel passage-forming member 20F. The fuel passage-forming member 20F is made of a single resin material such as polyethylene and may be manufactured by injection molding described in the above embodiment or by another pipe molding technique, for example, blow molding method or tube extrusion molding method. When the blow molding method is employed, the manufacturing method forms parison of the resin material and then manufactures the fuel passage-forming member 20F by die forming. When the tube extrusion molding method is employed, the manufacturing method extrudes the resin material in a tubular form.

The opening-forming member 60F includes a cover member 61F and a filler inlet-forming member 65F. An opening-closing mechanism 70F attached to the cover member 61F. The filler inlet-forming member 65F supports an opening-closing mechanism 80F to be openable and closable and includes an opening-forming section 65Fa provided to form a filler inlet 62Fa, an opening support section 65Fb formed cylindrically from an edge of the opening-forming section 65Fa and a welded end 65Fc of the expanded diameter from the outer periphery of the opening-forming section 65Fa. The welded end 65Fc is formed to have an L-shaped cross section to cover from the end face to the lateral surface of the fuel passage-forming member 20F and is welded to the welding end 24F at its edge face.

According to this embodiment, the welded end 65Fc of the filler inlet-forming member 65F is positioned to cover the welding end 24F of the fuel passage-forming member 20F and their welding area is greater than an expected welding area at an end of the fuel passage-forming member 20F. This enables the filler inlet-forming member 65F to be securely fixed to the fuel passage-forming member 20F.

The welded end 65Fc of the filler inlet-forming member 65F is provided to cover from the upper end face to the lateral surface of the fuel passage-forming member 20F. The filler inlet-forming member 65F accordingly has the large bearing capacity to an external force, for example, a force applied by a fuel gun or collision of a vehicle and has excellent mechanical strength.

Additionally, the fuel passage-forming member 20F can be manufactured with the high productivity by employing an adequate manufacturing method, such as blow molding or extrusion molding.

G. Modification of Fifth Embodiment

Figure 11:
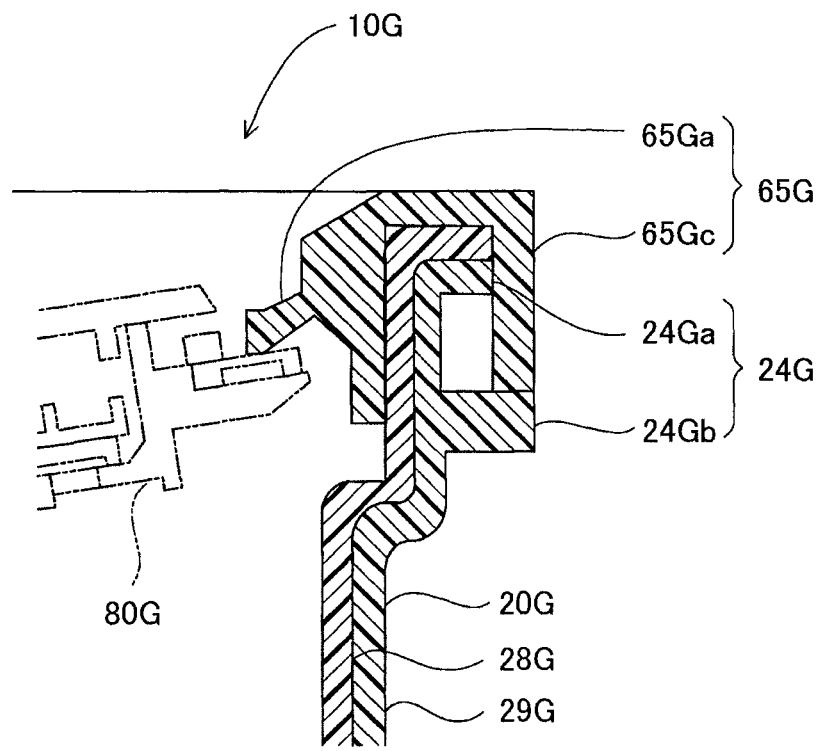
FIG. 11 is a cross sectional view illustrating a main part of a fueling device according to a modification of the fifth embodiment.

FIG. 11 is a cross sectional view illustrating a main part of a fueling device 10G according to a modification of the fifth embodiment. This modification is characterized by the structures of a fuel passage-forming member 20G and an opening-forming member 60G. The fuel passage-forming member 20G is formed by stacking two different resin materials, i.e., by stacking a resin inner layer 28G and a resin outer layer 29G. The resin outer layer 29G is made of a conductive resin material. When polyethylene is used for the conductive resin material, the electrical conductivity is provided by addition of a metal filler (for example, stainless steel, nickel, chromium, zinc, copper, aluminum, gold, silver, magnesium, titanium or any combination thereof) or carbon fibers. The fuel passage-forming member 20G made of a resin is likely to the charged. The resin outer layer 29G made of the conductive resin material, however, provides a grounding conductor path for effective, removal of charges. The fuel passage-forming member 20G has a welding end 24G below its end face. The welding end 24F has a first welding element 24Ga and a second welding element 24Gb in disc shapes protruded radially outward from the lateral surface of the fuel passage-forming member 20G. The first and second welding elements 24Ga and 24Gb are arranged away from each other across a specified gap in the axial direction of the fuel passage-forming member 20G. The fuel passage-forming member 20G may be manufactured by injection molding described in the above embodiment or by another pipe molding technique, for example, blow molding method or tube extrusion molding method.

A welded end 65Gc of a filler inlet-forming member 65G is formed to have the expanded diameter from the outer periphery of an opening-forming section 65Ga. The welded end 65Gc is formed to have an L-shaped cross section to cover the end face to the lateral surface of the fuel passage-forming member 20G. The welded end 65Gc is welded to the first welding element 24Ga on its inner surface and is welded to the second welding element 24Gb on its edge face.

This modification has the larger welding area than an expected welding area when one end of the filler inlet-forming member 65G is welded to the end face of the fuel passage-forming member 20G. Additionally, the welded end 65Gc is welded to the two welding elements, i.e., the first and second welding elements 24Ga and 24Gb. This enables the filler inlet-forming member 65G to be securely welded to the fuel passage-forming member 20G. The two welding places of the welding end 24G are unlikely to be damaged simultaneously by an external force, for example, collision of a vehicle, and ensures the high sealing power. Even when the resin outer layer 29G is made of the resin material mixed with carbon to provide the electrical conductivity, the two welding places enhance the welding power between the welding end 24G and the welded end 65Gc.

H-J Other Modifications

Figure 12:
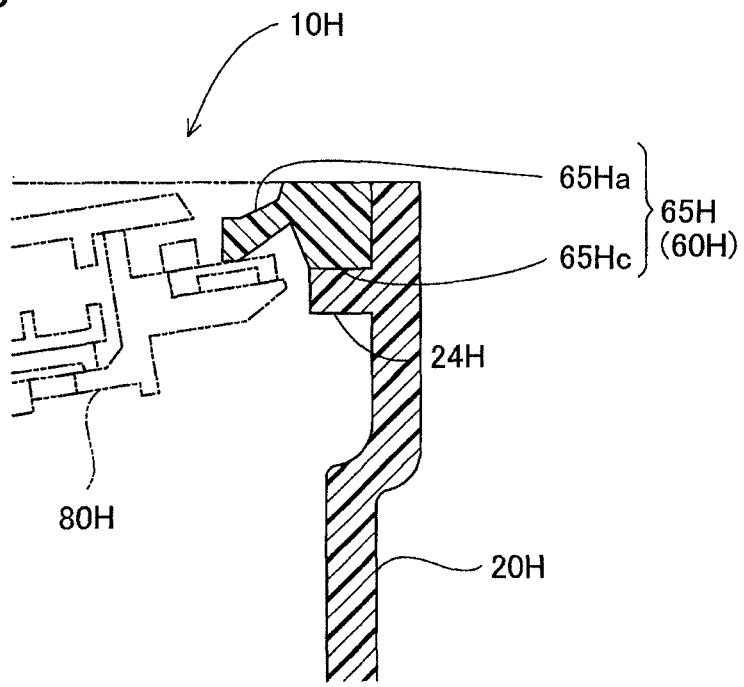
FIG. 12 is a cross sectional view illustrating another modification of the fifth embodiment.

FIG. 12 is a cress sectional view illustrating another modification of the fifth embodiment. The modification of FIG. 12 is characterized by the shapes of a welding end 24H and a welded end 65Hc of a filler inlet-forming member 65H. The welding end 24H is located below an end face of a fuel passage-forming member 20H and is protruded radially inward from the inner surface of the fuel passage-forming member 20H. The welded end 65Hc is welded to the welding end 24H in the state that the upper surface of the welded end 65Hc is positioned by and is in close contact with the inner face of the fuel passage-forming member 20H.

Figure 13:
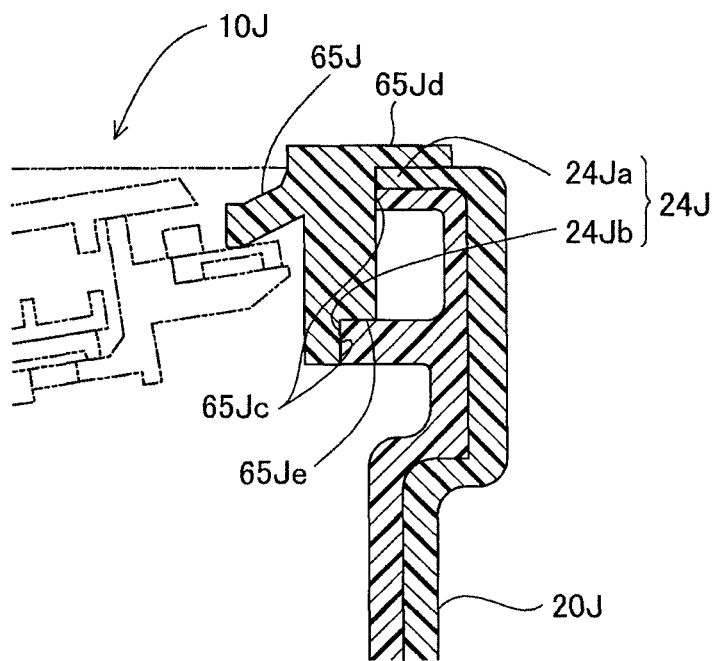
FIG. 13 is a cross sectional view illustrating another modification of the fifth embodiment.

The shapes and the locations of the welding end and the welded end may be changed adequately by taking into account enhancement of welding strength and easiness of welding. For example, as shown in FIG. 13, a welding end 24J is formed on the side face of a fuel passage-forming member 20J. The welding end 24J has a first welding element 24Ja and a second welding element 24Jb in disc shapes. The first welding element 24Ja is protruded in a disc shape inward from an end face of the fuel passage-forming member 20J. The second welding element 24Jb is located below the first welding element 24Ja in the axial direction and is protruded in a disc shape radially inward from the inner surface of the fuel passage-forming member 20J. The first and second welding elements 24Ja and 24Jb are arranged away from each other across a specified gap in the axial direction of the fuel passage-forming member 20J.

A welded end 65Jc is formed on the outer periphery of a filler inlet-forming member 65J. An extended section 65Jd extended radially outward is formed at the top of the filler inlet-forming member 65J. Additionally, a step 65Je is formed at a lower corner on the outer periphery of the filler inlet-forming member 65J. The top of the filler inlet-forming member 65J or more specifically the extended section 65Jd is positioned by and is in close contact with the upper surface of the first welding element 24Ja. An upper part of the welded end 65Jc is welded to the first welding element 24Ja. The bottom of the filler inlet-forming member 65J or more specifically the step 65Je is positioned by the second welding element 24Jb, and a lower part of the welded end 65Jc is welded to the second welding element 24Jb. The welding area and the welding position between the welding end and the welded end may be set adequately in the contact areas of the filler inlet-forming member and the fuel passage-forming member by taking into account the easily welding place and the welding strength.

Figure 14:
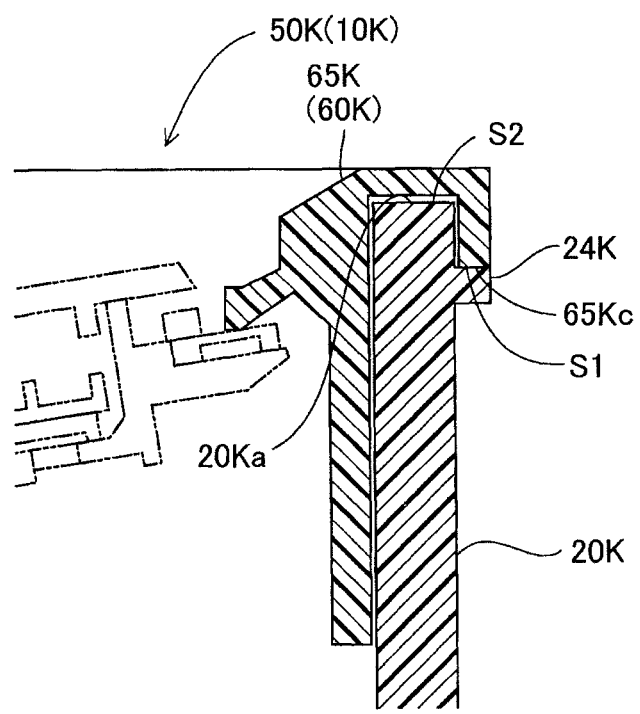
FIG. 14 is a cross sectional view illustrating another modification of the fifth embodiment.

As shown in a flap valve mechanism 50K of a fueling device 10K in FIG. 14, a welding area S1 between a welding end 24K of a fuel passage-forming member 20K and a welded end 65Kc of a filler inlet-forming member 65K may be set to be smaller than a welding area S2 of an end face 20Ka of the fuel passage-forming member 20K. The welding area may be set arbitrarily according to the sealing property between the welding end 24K and the welded end 65Kc and the mechanical strength.

The invention is not limited to the embodiments, examples or modifications described above but may be implemented by various other configurations within the scope of the invention.

The above embodiments employ laser welding as the means for welding the fuel passage-forming member to the opening-forming member. This is, however, not restrictive, but another means such as thermal welding using, for example, a hot plate or ultrasonic welding may be employed.

K. Other Aspects

The invention may be implemented by the following aspects.

In the fueling devices described in the embodiments, the welding end may be a flange of the expanded diameter from an opening end of a pipe body, and the welded end may be a flange of the expanded diameter from an opening end of a cover member. In this aspect, the fuel passage-forming member and the cover member are in close contact with each other via the flanges of the increased contact area at the welding end and the welded end and are thus securely welded to each other.

In the fueling devices described in the embodiments, the first resin material may be polyamide (PA) or ethylene vinyl alcohol copolymer (EVOH); the second resin material may be modified polyethylene (modified PE) thermal welded to PA or EVOH; and the third resin material may be a material selected among EVOH, PA and modified PE.

In the fueling devices described in the embodiments, the flap valve mechanism may support opening-closing members for respectively opening and closing two filler inlets on the cover member to be openable and closable.

In the fueling devices described in the embodiments, the welding end may be protruded radially outward from the lateral surface of the fuel passage-forming member, and the welded end may be welded to the welding end to cover the end face of the fuel passage-forming member to the lateral face of the fuel passage-forming member.

In the fueling devices described in the embodiments, the welding end may be protruded radially inward from the inner surface of the fuel passage-forming member, and the welded end may be welded to the welding end to cover the inner surface of the fuel passage-forming member.

In the fueling devices described in the embodiments, the welding end and the welded end may be welded to each other at a plurality of positions away from each other across a gap.

In the fueling devices described in the embodiments, the fuel passage-forming member may have a resin inner layer in a pipe shape and a resin outer layer laid on the outer surface of the resin inner layer. The resin outer layer may be made of a conductive resin material.

The invention claimed is:

1. A fueling device that supplies a fuel to a fuel tank, comprising:
    a fuel passage-forming member that includes a fuel passage connected with the fuel tank; and
    a flap valve mechanism that includes an opening-forming member attached to one end of the fuel passage-forming member, and an opening-closing mechanism attached to the opening-forming member to open and close a filler inlet of the opening-forming member, wherein
    the fuel passage-forming member includes a pipe body and a welding end formed on an opening end of the pipe body,
    the pipe body includes a resin inner layer in a pipe shape made of a first resin material and a resin outer layer laid on an outer surface of the resin inner layer and made of a second resin material,
    the opening-forming member includes a cover member that covers the opening end of the pipe body and a welded end formed on an opening end of the cover member and welded to the welding end, and
    the cover member is made of a third resin material welded to either one of the first resin material and the second resin material.

2. The fueling device according to claim 1, wherein
    the welding end is a flange of an expanded diameter from the opening end of the pipe body, and
    the welded end is a flange of an expanded diameter from the opening end of the cover member.

3. The fueling device according to claim 2, wherein
    the first resin material is polyamide (PA) or ethylene vinyl alcohol copolymer (EVOH),
    the second resin material is modified polyethylene (modified PE) thermally welded to PA or EVOH, and
    the third resin material is a material selected among EVOH, PA and modified PE.

4. The fueling device according to claim 3, wherein
    the flap valve mechanism includes opening-closing members that respectively open and close two filler inlets and attached to the cover member.

5. The fueling device according to claim 1, wherein
    the flap valve mechanism includes opening-closing members that respectively open and close two filler inlets and attached to the cover member.

6. The fueling device according to claim 1, wherein
    a ring-shaped projection of a triangular cross section is formed on either one of a surface of the welding end that is welded to the welded end and a surface of the welded end that is welded to the welding end, in a state before the welding end is welded to the welded end.

* * * * *